United States Patent
Misada et al.

(10) Patent No.: US 6,780,139 B2
(45) Date of Patent: Aug. 24, 2004

(54) TOROIDAL CONTINUOUSLY VARIABLE TRANSMISSION

(75) Inventors: Yasuharu Misada, Kashiwara (JP); Masao Goto, Habikino (JP); Yasuo Asai, Kashiwara (JP); Yoshihiro Ono, Gose (JP); Teruo Hoshino, Yao (JP); Adrian P. Lee, Leyland (GB); Jonathan Newall, Leyland (GB)

(73) Assignee: Koyo Seiko Company, Ltd., Osaka (JP)

( * ) Notice: Subject to any disclaimer, the term of this patent is extended or adjusted under 35 U.S.C. 154(b) by 43 days.

(21) Appl. No.: 10/189,741

(22) Filed: Jul. 8, 2002

(65) Prior Publication Data

US 2003/0013574 A1 Jan. 16, 2003

(30) Foreign Application Priority Data

Jul. 10, 2001 (JP) ........................................ 2001-209428

(51) Int. Cl.⁷ .............................................. F16H 15/38
(52) U.S. Cl. ........................................... 476/73; 476/40
(58) Field of Search ............................. 476/40, 42, 46, 476/73; 148/319, 906

(56) References Cited

U.S. PATENT DOCUMENTS

| | | | |
|---|---|---|---|
| 5,556,348 A | * | 9/1996 | Kokubu et al. ............... 476/40 |
| 5,735,769 A | | 4/1998 | Takemura et al. |
| 5,855,531 A | * | 1/1999 | Mitamura et al. ............ 476/46 |
| 6,066,068 A | * | 5/2000 | Takemura et al. ............ 476/40 |
| 6,074,324 A | | 6/2000 | Ishikawa et al. |
| 6,440,232 B1 | | 8/2002 | Takemura et al. |
| 2002/0086767 A1 | | 7/2002 | Yoshikawa et al. |

FOREIGN PATENT DOCUMENTS

| | | |
|---|---|---|
| JP | 6-159463 | 6/1994 |
| JP | 7-286649 | 10/1995 |
| JP | 10-231908 | 9/1998 |
| JP | 11-199983 | 7/1999 |
| JP | 2000-288936 | 10/2000 |
| JP | 2000-310307 | 11/2000 |
| WO | WO 00/60254 | 10/2000 |

* cited by examiner

Primary Examiner—William C. Joyce
(74) Attorney, Agent, or Firm—Smith, Gambrell & Russell, LLP

(57) ABSTRACT

For extension of service lives of rollers and discs of a toroidal continuously variable transmission, input discs, output discs and rollers are formed of a heat-resisting bearing steel. At least a roller has its peripheral surface subjected to a shot peening for achieving a compressive residual stress of 0.6 to 1.2 GPa and a hardness of HRC 63 to 66 at the outermost surface.

12 Claims, 4 Drawing Sheets

TOROIDAL CONTINUOUSLY VARIABLE TRANSMISSION

FIELD OF THE INVENTION

The present invention relates to a toroidal continuously variable transmission for use as, for example, automotive transmission.

DESCRIPTION OF THE PRIOR ART

The toroidal continuously variable transmission has an arrangement wherein input and output discs each having a concave raceway surface are so arranged as to have their raceway surfaces in face-to-face relation while rollers are disposed between these raceway surfaces of the discs as pressed thereagainst via oil films under high pressure.

When the input discs are rotated in the toroidal continuously variable transmission thus arranged, power is transmitted from the input discs to the output discs by means of shear force on the oil films present between peripheral surfaces of the rollers and surfaces of the discs. At this time, the surfaces of the rollers and discs are subjected to stress perpendicular thereto and a great shear stress corresponding to the shear force on the oil films. It may be said, therefore, that the surfaces of the rollers and discs of the toroidal continuously variable transmission are under particular severe contact conditions of high temperature and shear stress as compared with a rolling surface of a typical roller bearing which is essentially subjected to a perpendicular stress alone. Under such contact conditions specific to the rollers and discs of the toroidal continuously variable transmission, even a relatively small contact stress tends to cause plastic deformation of surface areas. In order to assure a required service life of the toroidal continuously variable transmission, therefore, the occurrence of the plastic deformation of the surface areas must be suppressed adequately. Furthermore, some contact conditions may entail the occurrence of a large number of cracks in the peripheral surfaces of the rollers. This also dictates the need for the adequate prevention of such cracks for the purpose of ensuring the required service life.

For these reasons, a high-carbon bearing steel such as SUJ2 or the like is used as material for the rollers and discs. Unfortunately, even the rollers and discs formed of the high-carbon bearing steel suffer severe fatigue due to high shear stress, thus resulting in a decreased life.

Regarding the above rollers and the discs, the rollers are constantly in contact with the discs exclusively at axially central portions of their peripheral surfaces, whereas the discs are in contact with the rollers at portions varied depending upon the speed change ratios of the transmission (that is, the discs are varied in diameter of contact circle thereof). Accordingly, the rollers are subject to more severe contact conditions than the discs, thus sustaining heavier fatigue. This leads to a tendency toward the shorter life of the rollers.

OBJECT AND SUMMARY OF THE INVENTION

In view of the foregoing problem of the prior art, the present invention is directed to the extension of the service lives of the rollers and discs for use in the toroidal continuously variable transmission.

A toroidal continuously variable transmission according to the invention comprises:
an input disc having a concave raceway surface in a side surface thereof;
an output disc having a concave raceway surface opposing the raceway surface of the input disc; and
a plurality of rollers disposed in a toroidal space defined by the raceway surfaces of the input disc and the output disc and rotated in contact with the raceway surfaces via oil films for transmitting torque between the discs by means of shear force on the oil films,
wherein the discs and rollers are formed of a heat-resisting bearing steel and wherein at least a peripheral surface of the roller is subjected to a surface hardening treatment by shot peening thereby having a compressive residual stress of 0.6 to 1.2 GPa and a hardness of HRC 63 to 66 at the outermost surface thereof.

In the toroidal continuously variable transmission thus constructed, the rollers and the discs have superior high-temperature strength and hardness because of the use of the heat-resisting bearing steel. Furthermore, the peripheral surfaces of the rollers, which are exposed to the most severe contact conditions and hence are most susceptible to fatigue, are subjected to a surface hardening treatment by shot peening. Therefore, an adequate strength can be achieved against high shear stress specific to contact surfaces between the rollers and the discs of the toroidal continuously variable transmission. If the compressive residual stress is less than 0.6 GPa, an adequate durability for the rollers and discs of the toroidal continuously variable transmission cannot be achieved. Increasing the compressive residual stress to above 1.2 GPa entails a significant increase of shot peening cost. Likewise, the rollers and discs are low in durability if the hardness is less than HRC 63. Increasing the hardness to above HRC 66 entails the increase of the shot peening cost. Therefore, adjustment is made to limit the compressive residual stress in the range of 0.6 to 1.2 GPa and the hardness in the range of HRC 63 to 66 thereby ensuring the adequate durability at less shot peening cost. As a result, the rollers and discs are less susceptible to fatigue, accomplishing long lives.

Under such conditions as to raise a problem associated with cracks produced in the peripheral surfaces of the rollers, the compressive residual stress may preferably be not less than 0.9 GPa. It is preferred that a hardened layer (portion hardened by the shot peening) may extend in depth of not less than 120 $\mu$m from surface.

In the above toroidal continuously variable transmission, it is preferred that the heat-resisting bearing steel contains:

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %,
provided that a total amount of Si and Mo is 1.0 wt % or more, the other components including iron and unavoidable impurities.

In this case, superior durability under high-temperature contact conditions can be achieved because of the use of the heat-resisting bearing steel particularly excellent in high-temperature strength. This combines with the effect of the surface hardening by shot peening to present excellent durability under contact conditions of high temperature and high shear stress which are specific to the toroidal continuously variable transmission.

DESCRIPTION OF THE PREFERRED EMBODIMENTS

Figure 1:
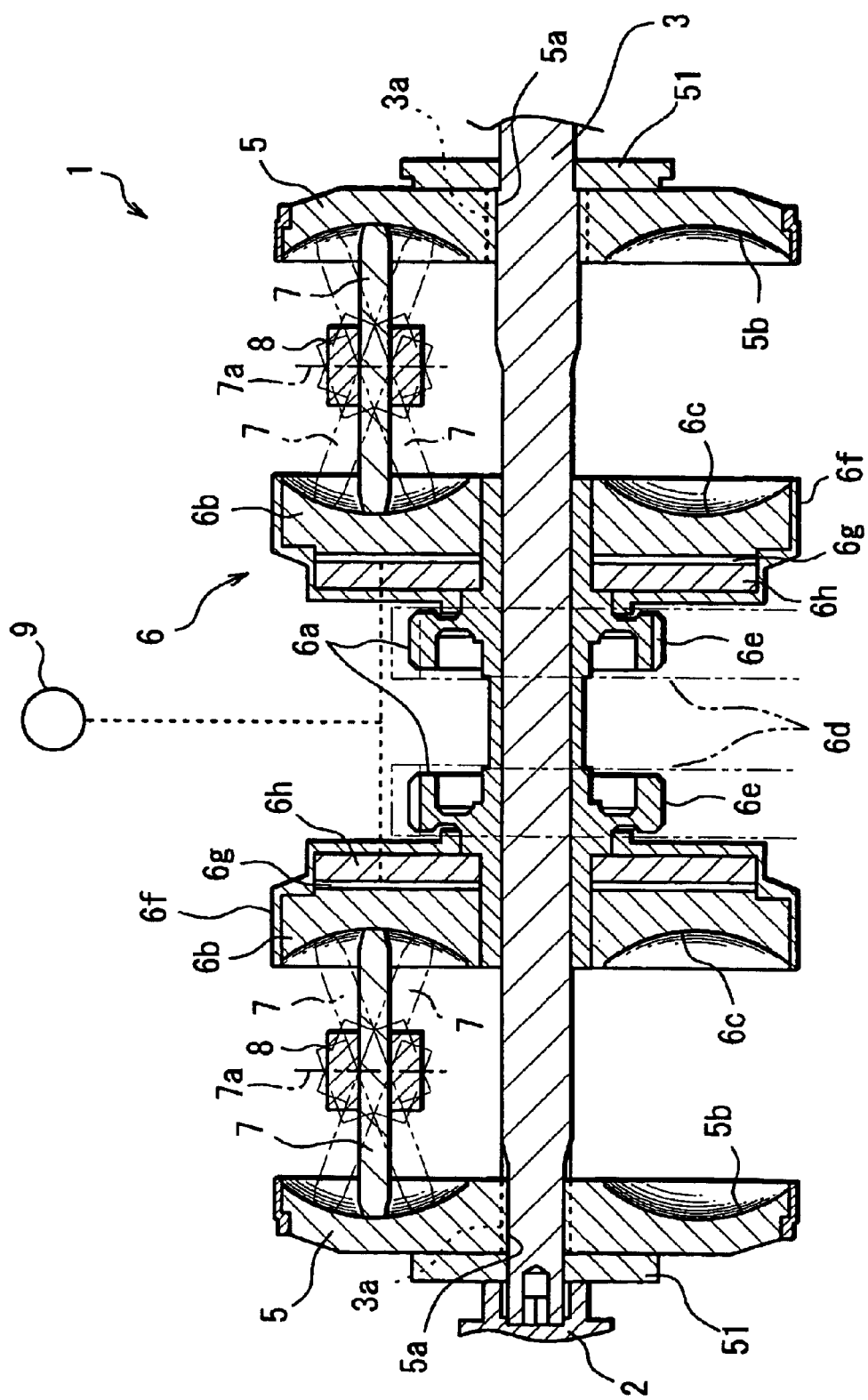
FIG. 1 is a schematic diagram showing a variator of a toroidal continuously variable transmission according to one embodiment of the invention.

Next, a preferred embodiment of the invention will be described with reference to the accompanying drawings. FIG. 1 is a schematic diagram showing a variator 1 of a toroidal continuously variable transmission according to one embodiment of the invention. This transmission is a full-toroidal continuously variable transmission which is a kind of toroidal continuously variable transmission. Referring to the figure, the variator 1 is provided with an input shaft 3 driven into rotation by an output shaft 2 of an engine, the input shaft 3 carrying input discs 5 on opposite end portions thereof.

Each of the discs 5 is formed with a concave raceway surface 5b in one side surface thereof and with a spline hole 5a on an inside periphery thereof. The spline hole 5a is formed with plural lines of grooves. The input disc 5 is integrally rotatably assembled on the input shaft 3 via connection between the spline hole 5a thereof and a spline shaft 3a formed on the input shaft 3. The input discs 5 are inhibited from moving away from each other by means of locking rings 51 secured to the input shaft 3.

The input shaft 3 is axially centrally provided with an output section 6 in a relatively rotatable relation with the input shaft 3, the output section 6 including a pair of output members 6a and output discs 6b each integrally rotably carried on the output member 6a. The output disc 6b is formed with a concave raceway surface 6c in one side surface thereof opposing the raceway surface 5b of the input disc 5. Formed on an outer periphery of the output member 6a are sprocket gears 6e meshed with a chain 6d, such that a power is outputted via the chain 6d.

The output discs 6b are assembled on the output member 6a as allowed to slightly axially move relative to the output member 6a, each output disc 6b having a backup plate 6h disposed on a rear side thereof via a clearance 6g. The clearance 6g is hermetically sealed by a casing 6f and an unillustrated seal. Oil hydraulics from a hydraulic power source 9 is supplied to the clearances 6g such that the output discs 6b are urged toward the respective opposite input discs 5 for applying a predetermined end load.

A space between the raceway surface 5b of the input disc 5 and the raceway surface 6c of the output disc 6b in opposed relation are configured as a toroidal space, in which three disc-like rollers 7 are arranged with equal circumferential spacing, the rollers 7 rotating in contact with the raceway surfaces 5b, 6c via oil films. Each of the rollers 7 is rotatably carried by a carriage 8 as having its rotation axis inclinably supported by the carriage 8. The carriage 8 is applied with a hydraulic drive force in directions intersecting the drawing surface of FIG. 1.

In the variator 1, as a pair of input discs 5 are rotated, shear force on the oil films permit torque to be transmitted from the input discs 5 to the output discs 6b via the respective sets of three rollers 7. The roller 7 carried by the carriage 8 permits the inclination of the rotation axis 7a thereof in order to eliminate unbalance between a reaction force developed at the carriage 8 by the torque transmission and a required torque for driving the output disc 6b. This varies the position of the roller 7 as shown by two-dot-dash lines in the figure, thereby continuously changing speed change ratio between the discs 5, 6b.

The rollers 7 and discs 5, 6b are formed of heat-resisting bearing steel (KUJ7 commercially available from KOYO SEIKO CO., LTD.). The compositions of the heat-resisting bearing steel are as follows:

C: 0.8 wt %–1.5 wt %
Si: 0.5 wt %–2.0 wt % (more preferably 1.0 wt % or less)
Mn: 0.3 wt %–2.0 wt %
Cr: 1.3 wt %–1.98 wt %
Mo: 0.3 wt %–1.0 wt %,
provided that a total amount of Si and Mo is 1.0 wt % or more, the other components including iron and unavoidable impurities.

The rollers 7 and discs 5, 6b may be formed of the heat-resisting bearing steel of the above compositions thereby achieving high-temperature strength and hardness. Thus, such rollers and discs have longer service lives than those formed of a normal high-carbon bearing steel (SUJ2).

The above heat-resisting bearing steel is a particularly excellent bearing steel which is disclosed in Japanese Unexamined Patent Publication No. 3(1991)-253542 and which is particularly in expensive contributing to the fabrication cost reduction and features such a high operating temperature limit of up to 250° C. However, this bearing steel has a hardness of HRC 62 to 63 after subjected to tempering at a temperature of 240° C. to 260° C. Therefore, this bearing steel is low in surface hardness when used as material for the rollers and discs. In an approach to overcome this problem, shot peening is applied to required portions of the rollers 7 and discs 5, 6b formed of the above heat-resisting bearing steel, thereby imparting thereto predetermined hardness and compressive residual stress.

Figure 2:
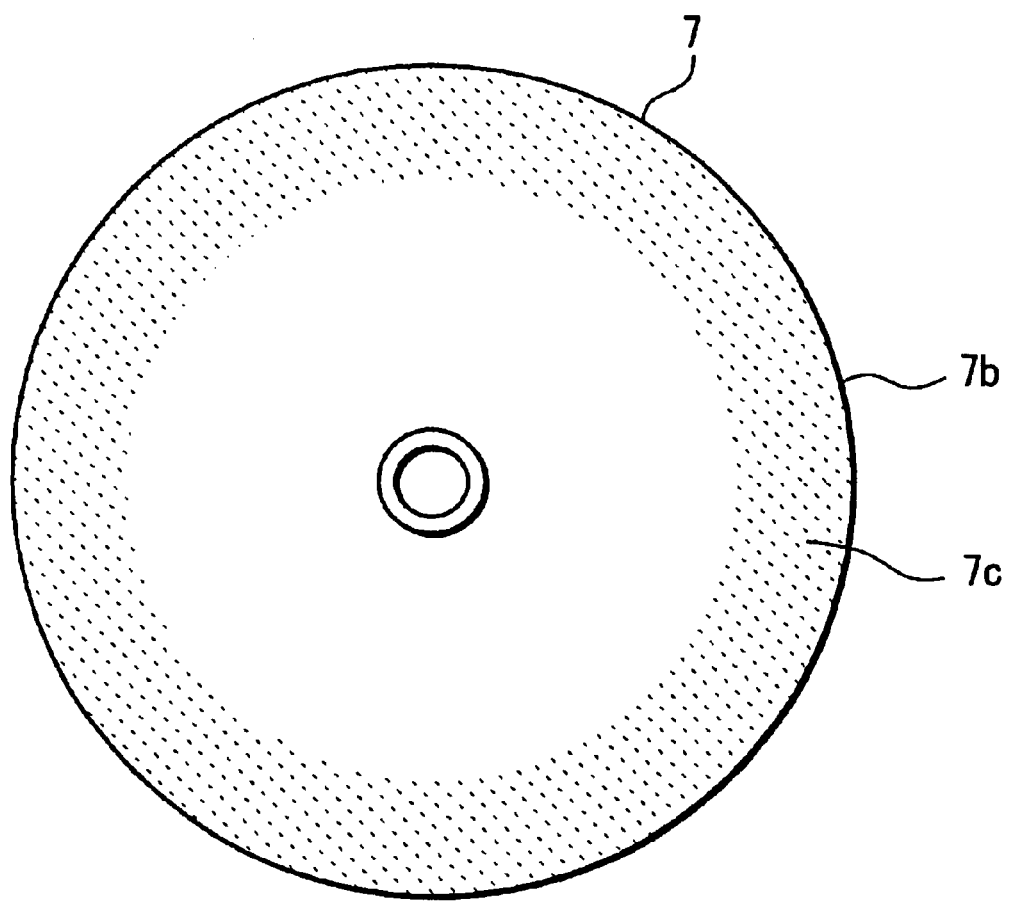
FIG. 2 is a plan view showing a roller of the variator.

FIG. 2 is a plan view of the roller 7. In the roller 7, the shot peening is applied to at least a peripheral surface 7b thereof, and preferably to a circumferential area 7c near the peripheral surface (dotted area in the figure), as well. On the other hand, the shot peening is applied to the overall raceway surfaces 5b, 6c of the discs 5, 6b.

Shot peening conditions for the roller include, for example, shot particles formed of Hv 800 steel and having a diameter of 0.8 mm; peening pressure of 5 kgf/cm$^2$; peening time of 2 minutes and 30 seconds; work speed of 12 rpm; and work-nozzle distance of 100 mm. As to the disc, the shot peening is performed under the same conditions as the above except that the peening time is 4 minutes and 20 seconds. This is because the peening time depends on work shape.

The above shot peening induces transformation of residual austenite to martensite, resulting in 15 to 130% increase of the surface hardness. Further, the shot peening develops such a compressive residual stress as to counteract the shear force. It is noted that the shot peening under the above conditions imparts the compressive residual stress to a depth of 30 to 80 μm from the outermost surface.

It is desirable that the rollers and discs have a compressive residual stress at surface of 0.6 to 1.2 GPa and a hardness of HRC 63 to 66. If the compressive residual stress is less than 0.6 GPa, the rollers and discs do not have such an adequate durability as to be used in the toroidal continuously variable transmission. On the other hand, increasing the compressive residual stress to above 1.2 GPa entails a substantial increase of the shot peening cost. Likewise, the rollers and discs are low in durability if the hardness is less than HRC 63. Increasing the hardness to above HRC 66 entails the substantial increase of the shot peening cost. Thus, the adequate durability can be attained at less shot peening cost by limiting the compressive residual stress within the range of 0.6 to 1.2 GPa and the hardness within the range of HRC 63 to 66.

The rollers may preferably have the compressive residual stress of 0.9 GPa or more under such conditions as to raise a problem associated with cracks in the peripheral surface of the roller. Also, the depth of a hardened layer (portion hardened by shot peening) may preferably be not less than 120 μm from surface.

In this manner, there may be fabricated the rollers and discs capable of withstanding contact conditions of high temperature and high shear stress which are specific to the toroidal continuously variable transmission. Besides, the rollers and discs are inexpensive, as described above, thus lending themselves to mass production.

The roller and disc fabricated in the aforementioned manner were mounted to an actual machine for test. The test demonstrated that the roller and disc present about six times longer service life at the maximum pressure of 3.6 GPa at contact surface, as compared with a roller formed of SUJ2. Thus, a toroidal continuously variable transmission equipped with the long-life rollers and discs can be offered. It is noted that the rollers failed earlier than the discs in the above test. Hence, the end of life was determined by the point of time when the roller failed.

The followings are the results of an experiment conducted to study the value of compressive residual stress associated with the number of cracks produced in the peripheral surface of the roller. The experiment used the following three types of rollers A, B and C (all formed of the above heat-resisting bearing steel) and was conducted the same way as in the above test using the actual machine. After operation for a predetermined period of time, each of the rollers A, B and C were examined for the number of cracks present on the peripheral surface thereof.

Figure 3:
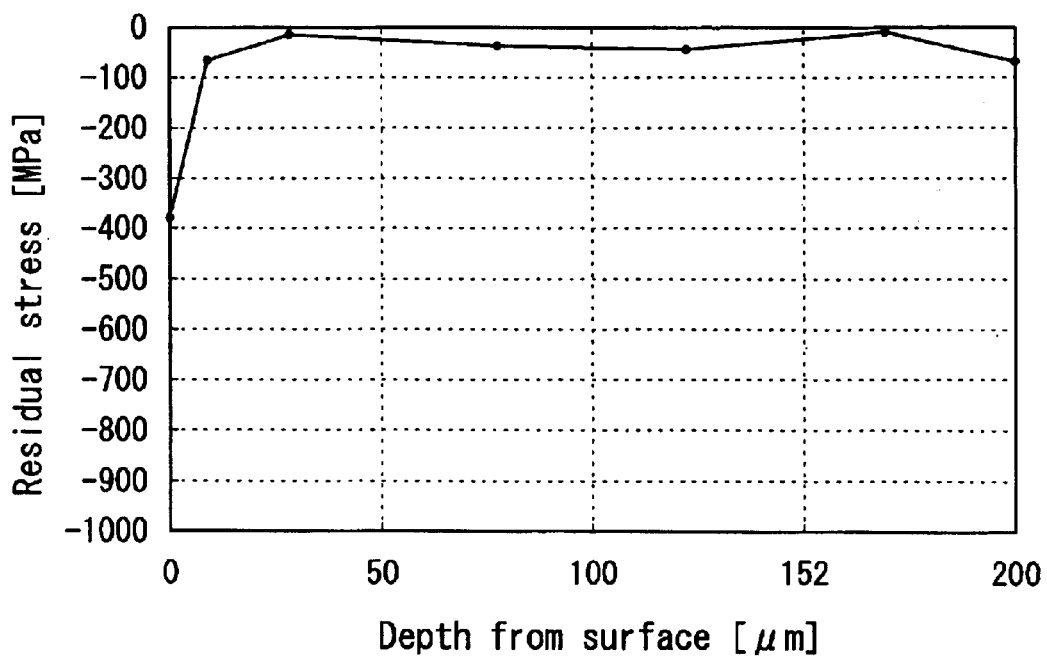
FIG. 3, FIG. 4 and FIG. 5 are graphical representations individually showing relations between compressive residual stress and depth from surface with respect to respective rollers A, B and C.
Figure 4:
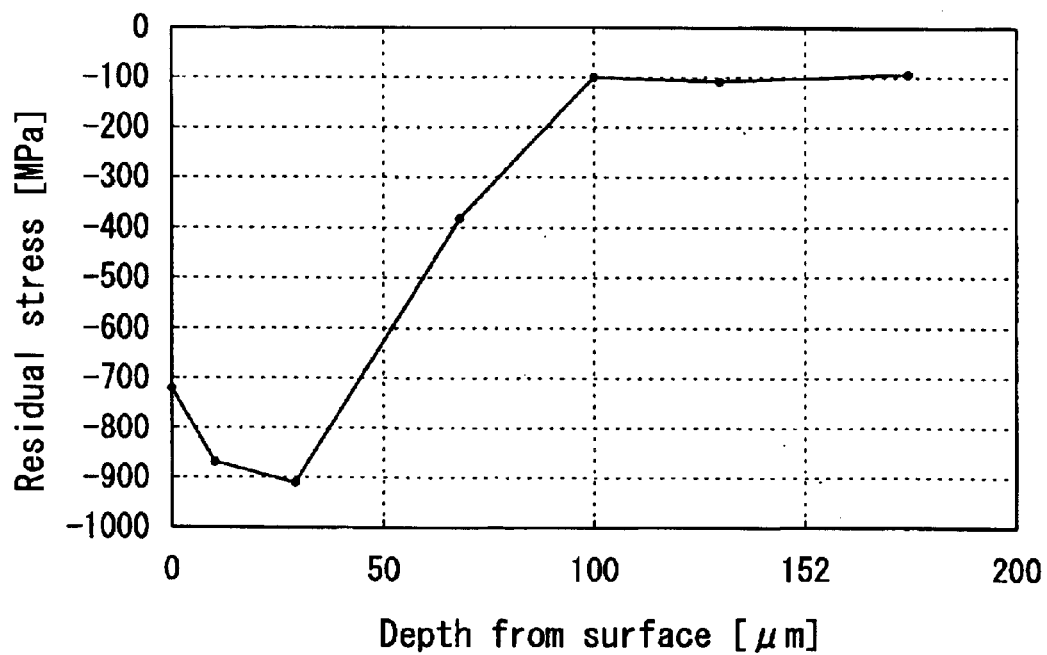
Figure 5:
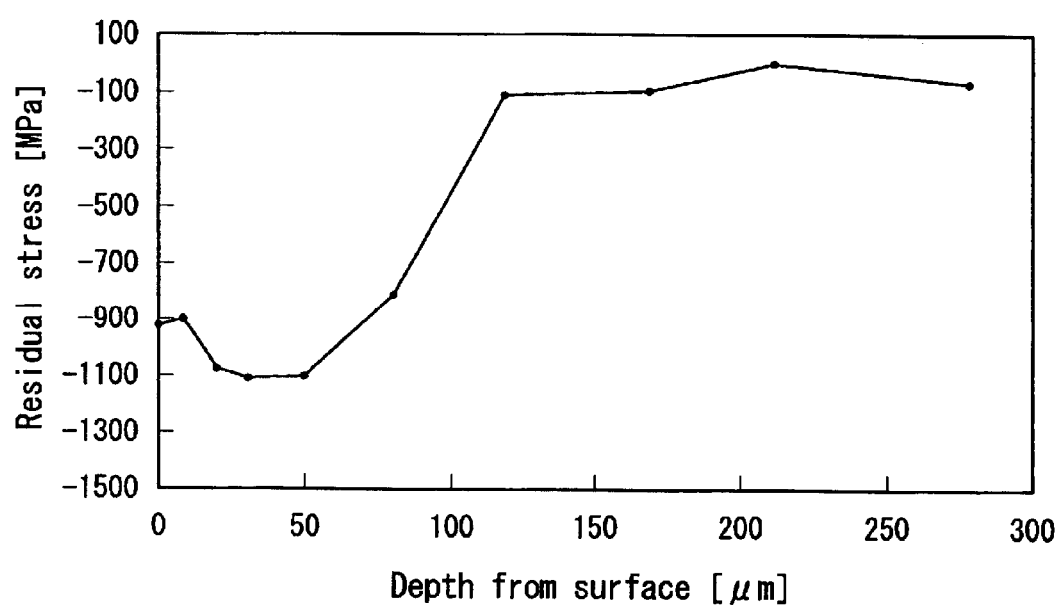

A: No shot peening treatment
B: Shot-peened, compressive residual stress at surface: 0.72 GPa
C: Shot-peened, compressive residual stress at surface: 0.92 GPa FIG. 3, FIG. 4 and FIG. 5 are graphical representations individually showing relations between compressive residual stress and depth from surface with respect to the respective rollers A, B and C. Incidentally, the roller and the disc were in contact at the maximum surface pressure of 4.4 GPa.

According the test results, the number of cracks on the peripheral surface of the roller A was 250 to 750 and that for the roller B was 20. The roller C produced no crack. Specifically, it was found that the occurrence of cracks is significantly decreased at the compressive residual stress of 0.72 GPa, and that the occurrence of cracks is completely obviated at 0.92 GPa.

In the above embodiment, the shot peening was applied only to the peripheral surface 7b and circumferential area 7c of the roller 7 and the raceway surfaces 5b, 6c. However, the shot peening may be applied to a wider area.

On the other hand, a measure of effect can be attained by applying shot peening to the peripheral surface of the roller 7 which is more liable to break. Instead of the aforesaid heat-resisting bearing steel, any one of the following bearing steels 1–3 may be used. All these bearing steels are capable of achieving the same degrees of heat resistance, strength and cost reduction when the surface thereof is imparted with predetermined hardness and compressive residual stress.

<<Heat-resisting Bearing Steel 1>>

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total amount of Si and Mo is 1.0 wt % or more. The bearing steel further contains one or two selected from the following group.

W: 0.05 wt %–0.50 wt %
V: 0.05 wt %–0.50 wt %

The other components include iron and unavoidable impurities.

<<Heat-resisting Bearing Steel 2>>

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total amount of Si and Mo is 1.0 wt % or more. The bearing steel further contains one or two selected from the following group.

Ni: 0.1 wt %–2.0 wt %
Cu: 0.05 wt %–1.00 wt %

The other components include iron and unavoidable impurities.

<<Heat-resisting Bearing Steel 3>>

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total amount of Si and Mo is 1.0 wt % or more. The bearing steel further contains one or two selected from the following group.

W: 0.05 wt %–0.50 wt %
V: 0.05 wt %–0.50 wt %

The bearing steel further contains one or two selected from the following group.

Ni: 0.1 wt %–2.0 wt %
Cu: 0.05 wt %–1.00 wt %

The other components include iron and unavoidable impurities.

What is claimed is:

1. A toroidal continuously variable transmission comprising:
   an input disc having a concave raceway surface in a side surface thereof;
   an output disc having a concave raceway surface opposing said raceway surface of the input disc; and
   a plurality of rollers disposed in a toroidal space defined by said raceway surfaces of the input disc and the output disc and rotated in contact with said raceway surfaces via oil films for transmitting torque between said discs by means of shear force on the oil films, wherein said discs and rollers are formed of a heat-resisting bearing steel and subjected to tempering at a temperature of 240° C. or over, and wherein at least a peripheral surface of said roller is subjected to a surface hardening treatment by shot peening thereby having a compressive residual stress of 0.6 to 1.2 GPa and a hardness of HRC 63 to 66 at an outermost surface thereof.

2. The toroidal continuously variable transmission as claimed in claim 1, wherein the compressive residual stress is in the range of 0.9 to 1.2 GPa.

3. The toroidal continuously variable transmission as claimed in claim 1, wherein a layer hardened by shot peening extends in depth of 120 $\mu$m or more.

4. The toroidal continuously variable transmission as claimed in any one of claims 1–3, wherein said heat-resisting bearing steel contains the following:

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total content of Si and Mo is not less than 1.0 wt %, and the other components include iron and unavoidable impurities.

5. The toroidal continuously variable transmission as claimed in claim 1, wherein the raceway surface of said disc is subjected to a surface hardening treatment by shot peening thereby having a compressive residual stress of 0.6 to 1.2 GPa and a hardness of HRC 63 to 66 at an outermost surface thereof.

6. The toroidal continuously variable transmission as claimed in claim 1, wherein said discs and rollers are subjected to tempering at a temperature of 240° C. to 260° C.

7. The toroidal continuously variable transmission as claimed in claim 1, wherein said discs and rollers have a hardness of HRC 62 to 63 after the tempering.

8. The toroidal continuously variable transmission as claimed in claim 1, wherein said transmission is of a full-toroidal type.

9. The toroidal continuously variable transmission as claimed in claim 1, wherein said discs and rollers are subjected to tempering at a temperature of 240° C. to 260° C. to thereby have a hardness of HRC 62 to 63 after the tempering.

10. The toroidal continuously variable transmission as claimed in claim 1, wherein said discs and rollers are subjected to tempering at a temperature of 240° C. to 260° C. to thereby have a hardness of HRC 62 to 63 after the tempering, and said heat-resisting bearing steel contains the following:

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total content of Si and Mo is not less than 1.0 wt %, and the other components include iron and unavoidable impurities.

11. The toroidal continuously variable transmission as claimed in claim 1, wherein the transmission is of full-toroidal type, said discs and rollers are subjected to tempering at a temperature of 240° C. to 260° C. to thereby have a hardness of HRC 62 to 63 after the tempering, and said heat-resisting bearing steel contains the following:

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total content of Si and Mo is not less than 1.0 wt %, and the other components include iron and unavoidable impurities.

12. A full-toroidal continuously variable transmission comprising:

an input disc having a concave raceway surface in a side surface thereof;

an output disc having a concave raceway surface opposing said raceway surface of the input disc; and a plurality of rollers disposed in a toroidal space defined by said raceway surfaces of the input disc and the output disc and rotated in contact with said raceway surfaces via oil films for transmitting torque between said discs by means of shear force on the oil films, wherein said discs and rollers are formed of a heat-resisting bearing steel and subjected to tempering at a temperature of 240° C. to 260° C. to thereby have a hardness of HRC 62 to 63 after the tempering, wherein at least a peripheral surface of said roller is subjected to a surface hardening treatment by shot peening thereby having a compressive residual stress of 0.9 to 1.2 GPa and a hardness of HRC 63 to 66 at an outermost surface thereof which extends in depth of 120 $\mu$m or more, and wherein said heat-resisting bearing steel contains the following:

C: 0.8 wt %–1.5 wt %
Si: 0.5 wt %–2.0 wt %
Mn: 0.3 wt %–2.0 wt %
Cr: 1.3 wt %–1.98 wt %
Mo: 0.3 wt %–1.0 wt %, provided that a total content of Si and Mo is not less than 1.0 wt %, and the other components include iron and unavoidable impurities.

* * * * *